United States Patent Office 2,915,365
Patented Dec. 1, 1959

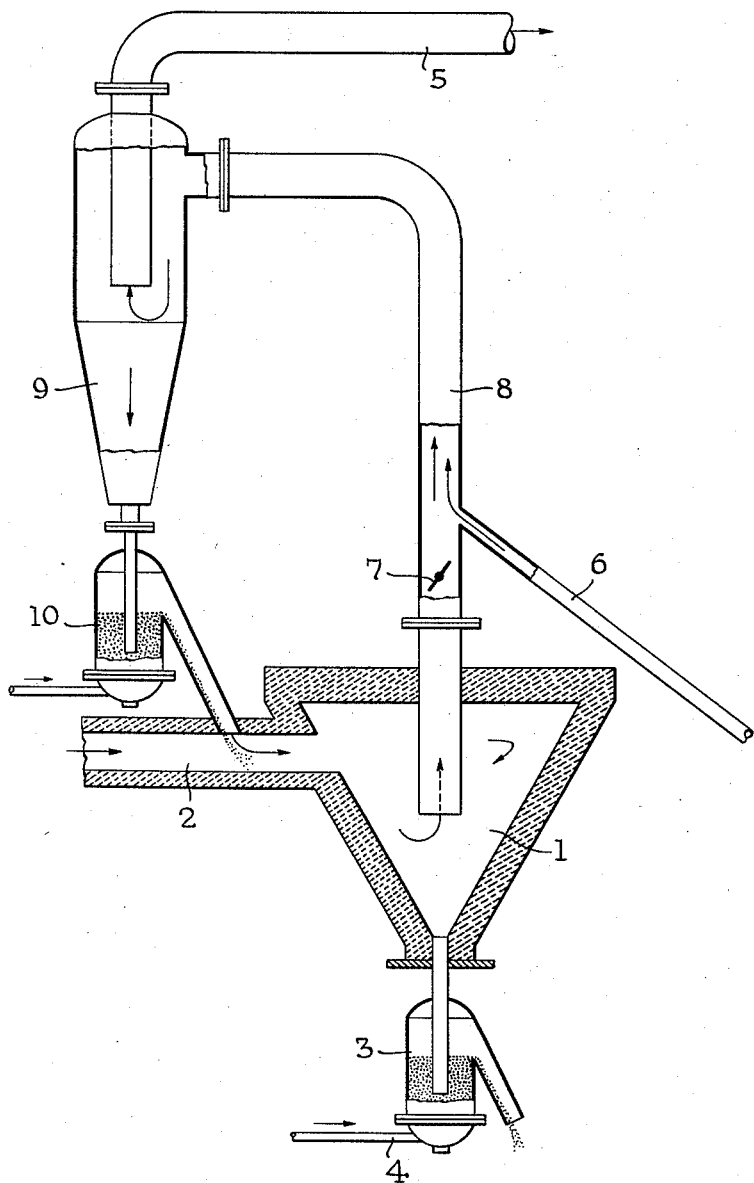

2,915,365

METHOD OF PREPARING ACTIVATED ALUMINA FROM COMMERCIAL ALPHA ALUMINA TRIHYDRATE

Fernand Saussol, Salindres, France, assignor to Pechiney, Compagnie de Produits Chimiques et Electrometallurgiques, Paris, France, a corporation of France Application June 20, 1955, Serial No. 516,719

Claims priority, application France June 28, 1954

5 Claims. (Cl. 23—142)

As is known, the thermal decomposition of alpha alumina trihydrate leads, by partial decomposition, to an activated alumina characterized by a large specific surface which imparts to it remarkable adsorbent properties. The specific surface of the dehydrated product depends on its water content. For the usual activated products, this content is of the order of 0.6 to 0.3 mol water per mol alumina and their specific surface, measured by nitrogen adsorption at $-195°$ according to the B.E.T. method, attains 200 to 250 sq. meters per gram, which corresponds to an excellent activity.

However, under prolonged heating, for example above 400° C., dehydration of these alumina types takes place, followed by a rapid decrease in specific surface and adsorption properties.

In order to obtain activated aluminas which have enhanced temperature stability, it was necessary up till now to use alumina gels as starting material. However, the preparation of these gels constitutes a most delicate and laborious operation.

The object of the present invention consists in preparing, starting from commercial alpha alumina trihydrate, of a highly activated alumina which is capable of retaining its adsorption properties even after prolonged heating at relatively high temperatures, for example of the order of 500° C. The starting material used in the process of the present invention is relatively inexpensive: it is the trihydrate obtained by the Bayer process, universally used in the commercial preparation of alumina.

The dehydration is obtained by injecting the trihydrate into a stream of highly heated gases. The duration of contact between the alumina and the hot gases is extremely small: it may vary from a fraction of a second to several seconds. In a fraction of a second, the trihydrate particle is raised to a high temperature and is dehydrated more or less intensively according to the temperature of the gas. The resultant alumina is extremely active, even if its content of residual water be very small, less, for example, than 0.1 mol water per mol alumina.

Measurements of the specific surface indicates that the latter diminishes very slowly when the water content is reduced to a molecular ratio $H_2O/Al_2O_3$ of 0.05 and even 0.02.

To obtain instantaneous dehydration, use is made in practice of a stream of hot gas—generally air—the temperature of which ranges between 400 and 1000° C., and a quantity of alumina, of the order of 20 to 150 gr. per cubic meter of hot gas, is continuously dropped therein. The alumina may advantageously be dried and pre-heated before the dehydration step.

The single figure attached to the present specification represents in diagrammatic form an economical and practical apparatus suitable for carrying out the process of manufacture of the present invention in a continuous operation. It is adapted for an appreciable output, of the order of 100 kg. per hour.

Essentially, the apparatus comprises a conical chamber 1 of refractory material which operates in the manner of a cyclone, into which the hot gases and alumina are introduced tangentially through the refractory tube 2. The alumina, of a particle size ranging between a few microns and several hundred microns, is rapidly dehydrated in the gaseous stream and along the walls. It collects in the lower portion of the cone where it is removed as a fluidized bed through the seal 3 which functions in the manner of a hydraulic seal and the operation of which is insured by blowing in a small quantity of compressed air through the bottom 4.

The alumina feed is controlled by suction. The suction device is connected to the main 5 and draws off simultaneously the hot air contained in the chamber 1 as well as Bayer hydrate in the duct 6; a valve 7 enables the gas/alumina ratio to be controlled and maintained at a suitable value. The alumina is subjected to pre-heating in tube 8 and thereafter separates out from the hot air in (cyclone) chamber 9. The gas is removed by suction through main 5; the alumina drops into the seal 10, which functions in the manner of the seal 3, and finally enters into the tube 2, into which is also drawn by suction the hot gas coming from a (fore) furnace (not illustrated), the form of which depends on the type of fuel used, which can be gaseous, liquid or solid.

By the use of this apparatus, the operation is made continuous and includes regulation of the hot gas/alumina ratio; the sensible heat contained in the residual gases following dehydration is utilized to a maximum for preheating the hydrate.

*Example*

Using the apparatus just described, there have been carried out four successive preparations of alumina using increasing temperatures; the alumina feed (supply) remained the same in all the tests, namely 50 gr. per cubic meter of gas.

Following each of these four preparations, measurements were made of the water content, specific surface and adsorptive power of the alumina for water vapor. For purposes of comparison, the same measurements were made on aluminas which were dehydrated under the usual conditions; the same Bayer hydrate was used as the raw material in all instances.

The results obtained are set out in the following table:

| Method of Activating the Bayer hydrate | $H_2O/Al_2O_3$ | Surface, m.²/g. | Adsorption of Water Relative pressure; 0.5 |
|---|---|---|---|
| I. Instantaneous Dehydration— Gas Temp. ° C.: | | | |
| A—575 | 0.32 | 260 | 15 g./100 g. |
| B—750 | 0.13 | 240 | 14.5. |
| C—850 | 0.07 | 220 | 13.5. |
| D—980 | 0.02 | 125 | 9. |
| II. Slow Dehydration in Fluid System: | | | |
| A—to 350° C | 0.60 | 240 | 13. |
| B—to 560° C | 0.13 | 170 | 9. |
| III. Slow Dehydration by Furnace Heating: | | | |
| A—to 350° C | 0.60 | 200 | 10. |
| B—to 560° C | 0.10 | 125 | 7. |

Inspection of this table shows that in case of instantaneous dehydration in a stream (current) of hot air, the water content of the resultant product varies from 0.32 to 0.07 mol water per mol alumina, depending on the temperature of the gas, without producing an appreciable decrease in either specific surface or adsorptive power. It is necessary that this molecular water content drop to about 0.02 before the reduction of surface or of adsorptive capacity become appreciable.

It will also be observed that the other dehydration methods produce aluminas the activity of which drops much more rapidly with decrease in water content.

Hence, the instantaneous dehydration process is on the whole equivalent to the other methods when it is required to produce activated aluminas containing about 0.3 mol water per mol alumina; but its chief importance resides in the preparation of an alumina having a water content of less than 0.1 mol water per mol of alumina. In this field, it produces highly reactive aluminas which remarkably resist prolonged heatings at relatively high temperatures, this being due to the fact that the water content of these activated aluminas is less than the ratio water/alumina, corresponding to equilibrium at the temperature of use. Accordingly, they are hardly subject to thermal change. Thus, the alumina C in the above table, the water content of which is 0.07 mol water per mol alumina, undergoes a decrease of only 10% in its specific surface after being heated for 14 hours at 500° C.

The advantage of this type of activated alumina for use at relatively high temperatures is quite evident.

Moreover, when it forms part of a catalytic mixture, for example, a carrier, there is no risk of de-activating the other constituents of the catalyst when the latter are highly sensitive to the action of water vapor.

This difference in properties between products obtained by slow dehydration and those produced by instantaneous dehydration produces, moreover, a difference in internal structure which can be detected by X-ray analysis.

It is observed that when the various activated aluminas, set out in the above table, are heated between 700 and 900° C., there are obtained in all instances almost identical diagrams which approximate those of "eta" alumina.

However, following heating to a temperature somewhat higher than 900°, different characteristics are observed. Only the product prepared by instantaneous dehydration is progressively transformed into alpha alumina without passing through the kappa form. In contrast, the products obtained by progressive decomposition, even though rapid, all change into kappa alumina which, in turn, changes to alpha alumina.

In the practice of the present invention the time of contact of the trihydrate with the hot gases in the dehydration zone ranges from a fraction of a second to ten seconds.

I claim:

1. Process for transforming alpha alumina trihydrate into activated alumina possessing a high adsorptive power for water vapor ranging from 9–15 g. of water per 100 g. of alumina, comprising the steps of: contacting the trihydrate in finely divided state with a stream of hot gases at a temperature ranging between 400 and 1000° C., maintaining the contact between the trihydrate and gases for a time ranging from a fraction of a second to an upper limit of about ten seconds, and thereafter separating the dehydrated alumina from the hot gases.

2. A process according to claim 1, characterized in that the alumina is present in the contact zone in the amount of 20–150 grams of trihydrate per cubic meter of gas, and that the time of contact is such that the molar ratio $H_2O/Al_2O_3$ in the final resultant alumina product is not greater than about 0.32.

3. Continuous process for transforming alpha alumina trihydrate into activated alumina containing between 0.1 and 0.02 mol of water per mol alumina, and possessing a high adsorptive power for water vapor ranging from 9–15 g. of water per 100 g. of alumina, comprising the following steps: mixing finely divided alumina trihydrate with hot effluent gases from the dehydration operation as described below, whereby the particles are dried and preheated; separating the preheated particles from the cooled effluent gases; introducing the preheated particles into a stream of gases heated to a temperature within the range of 800 and 1000° C., and thereby forming a suspension of trihydrate particles in said hot gases in the proportion of 20–150 grams of trihydrate per cubic meter of gas; introducing said suspension into a combined contacting and separating chamber wherein the trihydrate is dehydrated and activated to the extent desired by contact with the heated gases for a time ranging from a fraction of a second to an upper limit of about ten seconds, and separated therefrom; withdrawing the gases freed of dehydrated alumina and using the same to preheat further quantities of alumina trihydrate to be treated, and separately withdrawing and recovering the segregated dehydrated, activated alumina.

4. Process according to claim 3, characterized in that the alpha alumina trihydrate used is produced by the Bayer process.

5. Process according to claim 3, characterized in that a stream of compressed gas is injected into the separated preheated trihydrate and into the separated dehydrated activated alumina, thereby converting the said separated trihydrate and activated alumina into fluidized masses adapted to be withdrawn in the condition of liquid-like masses.

References Cited in the file of this patent

UNITED STATES PATENTS

| | | |
|---|---|---|
| 1,871,792 | Horsfield | Aug. 16, 1932 |
| 1,871,793 | Horsfield | Aug. 16, 1932 |
| 2,351,091 | Bar | June 13, 1944 |
| 2,378,155 | Newsome | June 12, 1945 |
| 2,393,766 | Gorden | Jan. 9, 1946 |
| 2,478,675 | Tamele | Aug. 9, 1949 |
| 2,604,379 | Archibald | July 22, 1952 |
| 2,799,558 | Smith et al. | July 16, 1957 |

FOREIGN PATENTS

| | | |
|---|---|---|
| 118,641 | Australia | July 6, 1944 |

OTHER REFERENCES

Alumina Properties, Technical Paper No. 10, Aluminum Research Laboratories, Aluminum Co. of America, 1953, pp. 18, 20.

Thermal Transformations of Aluminas and Alumina Hydrates in Industrial and Engineering Chemistry, vol. 42, No. 7, pp. 1398–1403.